United States Patent
Lu et al.

(10) Patent No.: US 12,522,317 B2
(45) Date of Patent: Jan. 13, 2026

(54) RIDING VEHICLE AND RIDING VEHICLE MOTION ANALYSIS METHOD

(71) Applicant: Industrial Technology Research Institute, Hsinchu (TW)

(72) Inventors: Yen-Nien Lu, Tainan (TW);
Jyun-Siang Hsu, Nantou County (TW);
Kang Heng Mah, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 87 days.

(21) Appl. No.: 18/536,240

(22) Filed: Dec. 12, 2023

(65) Prior Publication Data
US 2025/0187700 A1   Jun. 12, 2025

(51) Int. Cl.
*B62M 6/50*   (2010.01)
*G01C 21/16*   (2006.01)

(52) U.S. Cl.
CPC ............... *B62M 6/50* (2013.01); *G01C 21/16* (2013.01)

(58) Field of Classification Search
None
See application file for complete search history.

(56) References Cited

U.S. PATENT DOCUMENTS

| | | | |
|---|---|---|---|
| 8,830,048 | B2 | 9/2014 | Kamen et al. |
| 10,414,454 | B2 | 9/2019 | Tseng et al. |
| 2016/0046339 | A1* | 2/2016 | Chen .................. H01H 9/02 324/207.13 |
| 2019/0127020 | A1* | 5/2019 | Shahana .................. B62M 6/50 |
| 2023/0192208 | A1 | 6/2023 | Watson et al. |

FOREIGN PATENT DOCUMENTS

| | | |
|---|---|---|
| CN | 204937313 | 1/2016 |
| CN | 108082384 | 5/2018 |
| CN | 110435791 | 11/2019 |
| CN | 218786041 | 4/2023 |
| CN | 218858617 | 4/2023 |

(Continued)

OTHER PUBLICATIONS

Jan Meyer et al., "Design and Modeling of a Textile Pressure Sensor for Sitting Posture Classification", IEEE Sensors Journal, May 24, 2010, pp. 1391-1398, vol. 10, No. 8.

(Continued)

*Primary Examiner* — Peter D Nolan
*Assistant Examiner* — Michael F Whalen
(74) *Attorney, Agent, or Firm* — JCIPRNET (57) ABSTRACT

A riding vehicle, used for a user to ride and detecting a riding posture of the user and a road surface condition, is provided. The riding vehicle includes a seat, multiple pressure sensors, a signal conversion module, an identifying control module, and at least one driver. The seat is configured for the user to ride. The pressure sensors are disposed on the seat to form multiple sensing areas. The signal conversion module is used to generate a pressure distribution state on the seat. The identifying control module is used to determine the riding posture according to the pressure distribution state and generate a control signal. The at least one driver generates an auxiliary driving force according to the control signal. A riding vehicle motion analysis method is also provided.

18 Claims, 12 Drawing Sheets

(56) References Cited

FOREIGN PATENT DOCUMENTS

| | | |
|---|---:|---|
| CN | 116036476 | 5/2023 |
| TW | M398440 | 2/2011 |
| TW | I564204 | 1/2017 |
| TW | 202014987 | 4/2020 |
| TW | I791591 | 2/2023 |
| TW | I801267 | 5/2023 |
| TW | 202325599 | 7/2023 |
| WO | 2019162826 | 8/2019 |

OTHER PUBLICATIONS

"Office Action of Taiwan Counterpart Application", issued on Oct. 8, 2024, p. 1-p. 13.
"Notice of allowance of Taiwan Counterpart Application", issued on Nov. 21, 2025, p. 1-p. 3.

\* cited by examiner

Identification of riding posture (flat road)

| | Shared weight ratio vs. Riding posture | | | Identification of riding posture | Electric drive speed increase |
|---|---|---|---|---|---|
| First partition R1 | Second partition R2 | Third partition R3 | Fourth partition R4 | | |
| 1 | 2 | 3 | 4 | P5 | E1 |
| 1 | 2 | 4 | 3 | P4 | E2 |
| 1 | 3 | 4 | 2 | P3 | E3 |
| 1 | 4 | 3 | 2 | P3 | E3 |
| 2 | 4 | 3 | 1 | P2 | E4 |
| 3.5 | 3.5 | 2 | 1 | P1 | E5 |
| 4 | 3 | 2 | 1 | P1 | E5 |
| 0 | 0 | 0 | 0 (but power meter detects pedaling behavior or GPS has movement information) | P0 | E6 |

FIG. 7A

Identification of riding posture (uphill)

| Shared weight ratio vs. Riding posture | | | | Identification of riding posture | Electric drive speed increase |
|---|---|---|---|---|---|
| First partition R1 | Second partition R2 | Third partition R3 | Fourth partition R4 | | |
| 1 | 2 | 3 | 4 | P5 | E1 |
| 1 | 2 | 3 | 4 | P4 | E2 |
| 1 | 2 | 4 | 3 | P3 | E3 |
| 1 | 3 | 4 | 2 | P3 | E3 |
| 2 | 3 | 4 | 1 | P2 | E4 |
| 2 | 4 | 3 | 1 | P1 | E5 |
| 3 | 4 | 2 | 1 | P1 | E5 |
| 0 | 0 | 0 | 0 | P0 | E6 |
| (but power meter detects pedaling behavior or GPS has movement information) | | | | | |

FIG. 7B

Identification of riding posture (downhill)

| | Shared weight ratio vs. Riding posture | | | | Identification of riding posture | Electric drive speed increase |
|---|---|---|---|---|---|---|
| First partition R1 | Second partition R2 | Third partition R3 | Fourth partition R4 | | | |
| 1 | 2 | 4 | 3 | | P5 | E1 |
| 1 | 3 | 4 | 2 | | P4 | E2 |
| 1 | 4 | 3 | 2 | | P3 | E3 |
| 2 | 4 | 3 | 1 | | P3 | E3 |
| 3 | 4 | 2 | 1 | | P2 | E4 |
| 4 | 3 | 2 | 1 | | P1 | E5 |
| 4 | 3 | 2 | 1 | | P1 | E5 |
| 0 | 0 | 0 | 0 | | P0 | E6 |
| (but power meter detects pedaling behavior or GPS has movement information) | | | | | | |

FIG. 7C

| Identification of riding posture | Pedaling frequency (corresponding auxiliary driving force) | | | | |
|---|---|---|---|---|---|
| | B1 | B2 | B3 | B4 | B5 |
| P5 | E1 | E2 | E3 | E4 | E5 |
| P4 | E2 | E3 | E4 | E5 | E5 |
| P3 | E3 | E4 | E5 | E5 | E6 |
| P2 | E4 | E5 | E5 | E6 | E6 |
| P1 | E5 | E5 | E6 | E6 | E5 |
| P0 | E6 | E6 | E6 | E5 | E5 |

FIG. 8

| Riding posture change frequency level | Pedaling frequency (corresponding fatigue level) |  |  |  |  |
|---|---|---|---|---|---|
| | Pedaling frequency | | | | |
| | B1 | B2 | B3 | B4 | B5 |
| Frequent | F7 | F6 | F5 | F4 | F3 |
| | F6 | F5 | F4 | F3 | F2 |
| | F5 | F4 | F3 | F2 | F1 |
| Moderate | F4 | F3 | F2 | F1 | |
| | F3 | F2 | F1 | | |
| Stable | F2 | F1 | | | |
| | F1 | | | | |

FIG. 9

RIDING VEHICLE AND RIDING VEHICLE MOTION ANALYSIS METHOD

TECHNICAL FIELD

The disclosure relates to a riding vehicle and an analysis method thereof, and in particular to a riding vehicle including a pressure sensing seat and a motion analysis method thereof.

DESCRIPTION OF RELATED ART

With the rise of the smart two-wheeled vehicle such as an electric-assisted bicycle and an electric-assisted motorcycle, more and more attention has been paid to improving the coordination between a user and a vehicle during riding. The current application is mainly to give a corresponding suggestion through obtaining a position or a distribution of a rider on a seat cushion in real time, and the rider needs to adjust the sitting position or adjust the seat cushion to a reasonable angle and height by himself.

However, the riding posture of the rider hides many motion intentions. For example, the trunk leans forward to reduce wind resistance and accelerate, the trunk is straightened to reduce physical exertion of core muscles and expand the field of view to maintain medium and low speed riding, or the center of gravity is tilted to smoothly make a turn. In addition, if the core muscles for maintaining a stable posture of the trunk become fatigued, riding safety may be affected, which also highlights the importance of detection of the riding posture. Therefore, intelligently detecting the riding posture and further obtaining the motion intentions of the rider to provide corresponding assistance is a promising opportunity.

SUMMARY

The disclosure provides a riding vehicle having a seat provided with pressure sensors.

The disclosure provides a riding vehicle motion analysis method, which includes the riding vehicle.

The riding vehicle of the disclosure is used for a user to ride and detecting a riding posture of the user and a road surface condition. The riding vehicle includes a seat, multiple pressure sensors, a signal conversion module, an identifying control module, and at least one driver. The seat is configured for the user to ride. The pressure sensors are disposed on the seat to form multiple sensing areas. The signal conversion module is used to generate a pressure distribution state on the seat. The identifying control module is used to determine the riding posture according to the pressure distribution state and generate a control signal. The at least one driver generates an auxiliary driving force according to the control signal.

The riding vehicle motion analysis method of the disclosure is used for a user. The riding vehicle motion analysis method includes the following steps. A riding vehicle is provided for the user to ride, and multiple pressure sensors are disposed on a seat to form multiple sensing areas. A pressure distribution state on the seat is sensed. A riding posture of the user is determined according to the pressure distribution state. An auxiliary driving force is generated by at least one driver according to the riding posture.

In an embodiment of the disclosure, the pressure sensors are arranged in a matrix.

In an embodiment of the disclosure, the pressure sensors are used to perform a pressure sensing action, the signal conversion module generates multiple sensing signals corresponding to the sensing areas according to the pressure sensing action, and the identifying control module is used to receive the sensing signals to determine the riding posture and generate the control signal according to the riding posture.

In an embodiment of the disclosure, at least one first sensor is further included and is used to sense speed information, and the identifying control module is used to determine whether the riding posture is standing cycling according to the speed information and the sensing signals. When the speed information is not equal to 0 and signal values of the sensing signals received by the identifying control module for a continuous period of time are 0, the riding posture is determined as standing cycling.

In an embodiment of the disclosure, at least one second sensor and multiple pedals are further included, and the at least one second sensor is disposed on at least one of the pedals and is used to perform a pedaling sensing action to generate pedaling frequency information.

In an embodiment of the disclosure, the identifying control module is used to control the at least one driver according to the pedaling frequency information and the riding posture, so that the at least one driver adjusts the auxiliary driving force of the riding vehicle.

In an embodiment of the disclosure, the identifying control module is used to determine a fatigue level of the user according to the pedaling frequency information and a change frequency of the riding posture, and provide a riding fatigue warning.

In an embodiment of the disclosure, the seat includes a front end and a rear end opposite to each other, the sensing areas are a first partition, a second partition, a third partition, and a fourth partition arranged from the front end toward the rear end, and the identifying control module determines the riding posture according to a magnitude relationship of pressure values corresponding to the first partition, the second partition, the third partition, and the fourth partition.

In an embodiment of the disclosure, the seat includes a first side and a second side opposite to each other, the sensing areas respectively correspond to the first side and the second side, and whether a force exerted by the user is balanced is determined by comparing a pressure value of the first side with a pressure value of the second side.

In an embodiment of the disclosure, an inertial measurement unit is further included. The inertial measurement unit is used to determine whether the road surface condition is an uphill road section, a downhill road section, or a flat road section. The identifying control module controls the at least one driver according to the road surface condition to adjust the auxiliary driving force.

Based on the above, in the riding vehicle of the disclosure, a load distribution of each area of the seat is detected by the pressure sensor, the actual riding posture of the user of the riding vehicle may be obtained, and the riding intention of the user may be analyzed, thereby providing the additional auxiliary driving force to achieve artificial intelligence (AI) assisted riding.

In order for the features and advantages of the disclosure to be more comprehensible, the following specific embodiments are described in detail in conjunction with the drawings.

DESCRIPTION OF THE EMBODIMENTS

Figure 1:
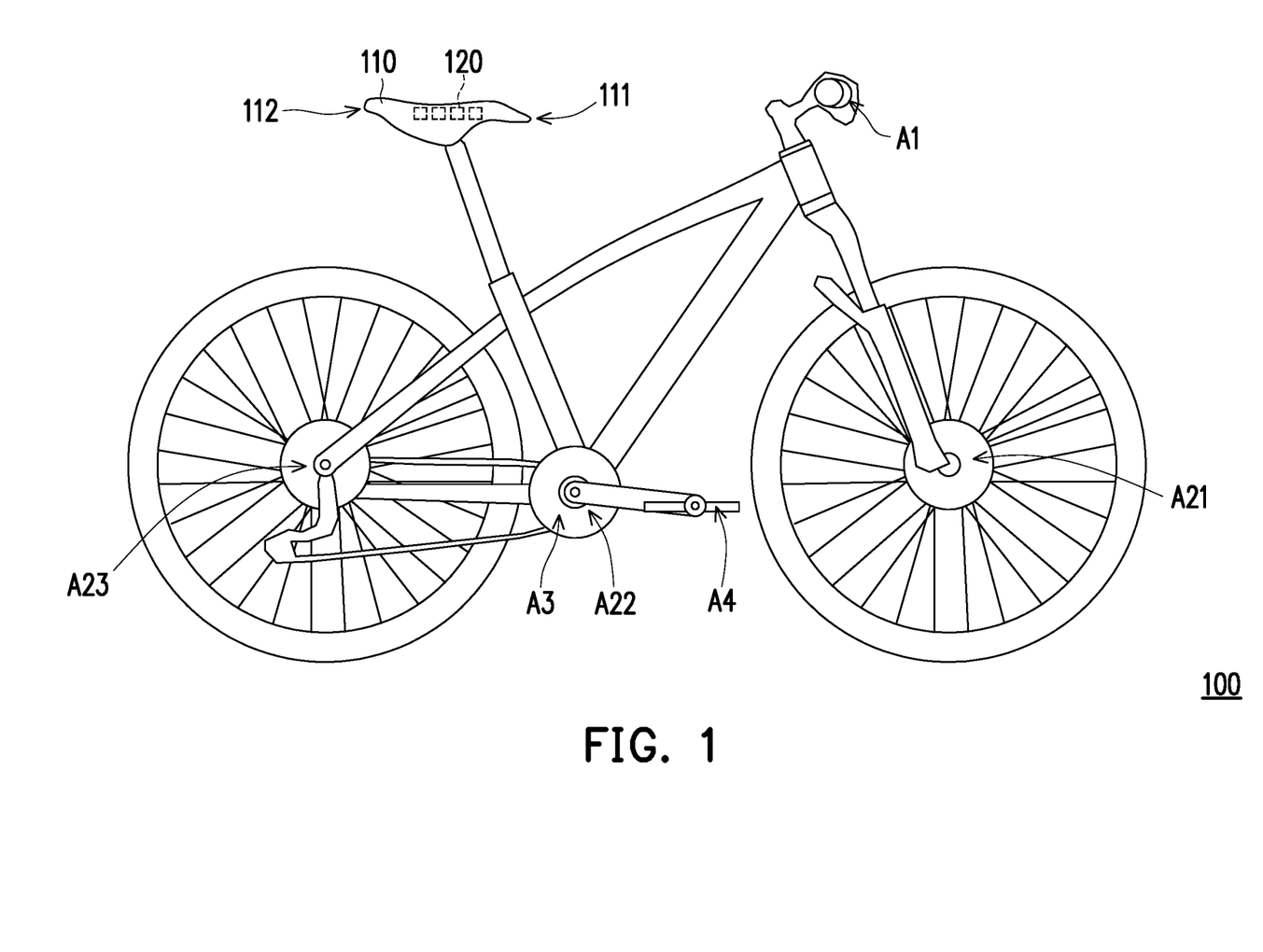
FIG. 1 is a schematic view of an appearance of a riding vehicle according to the disclosure.
Figure 2:
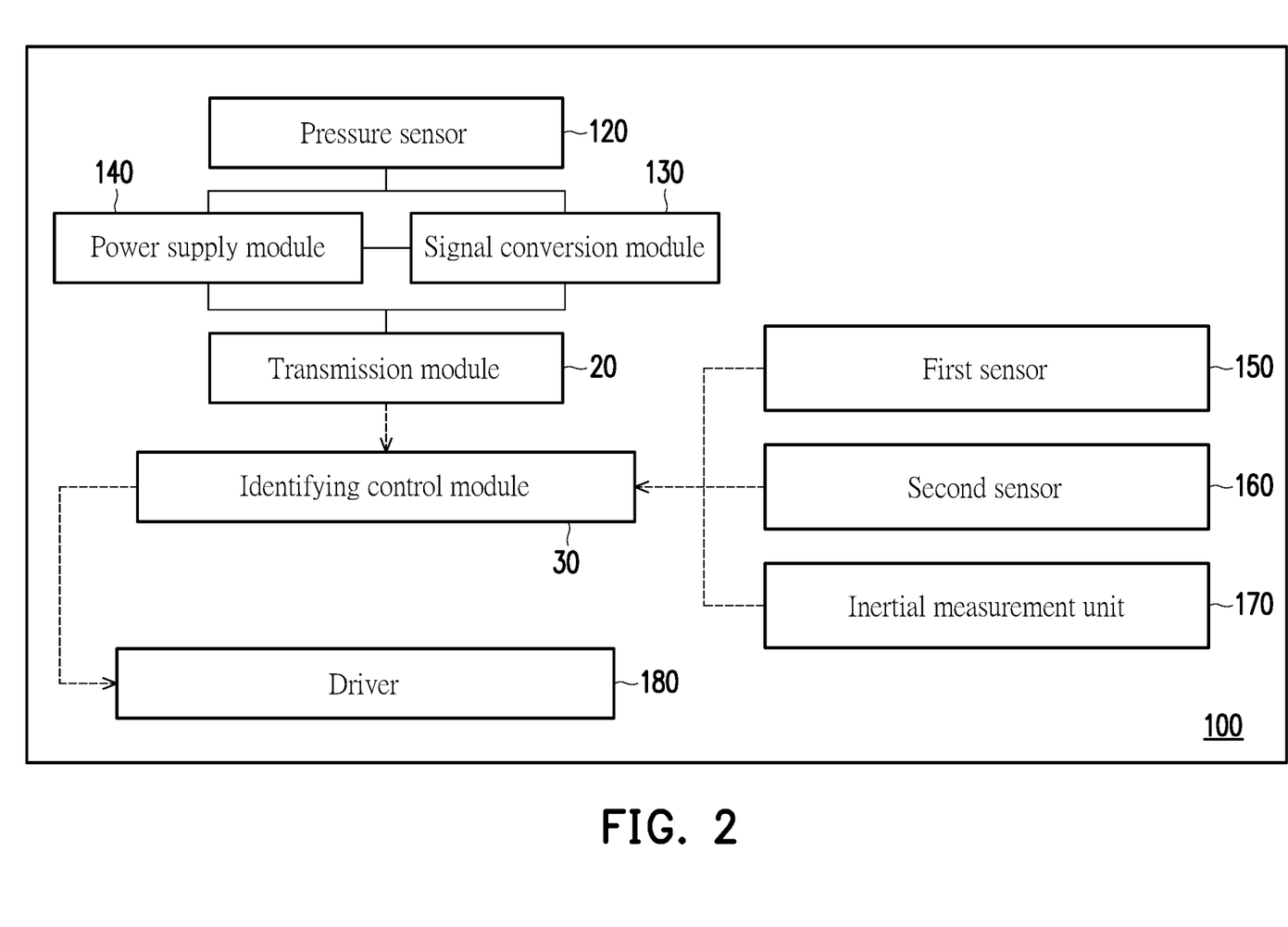
FIG. 2 is a schematic block view of a riding vehicle according to the disclosure.
Figure 4A:
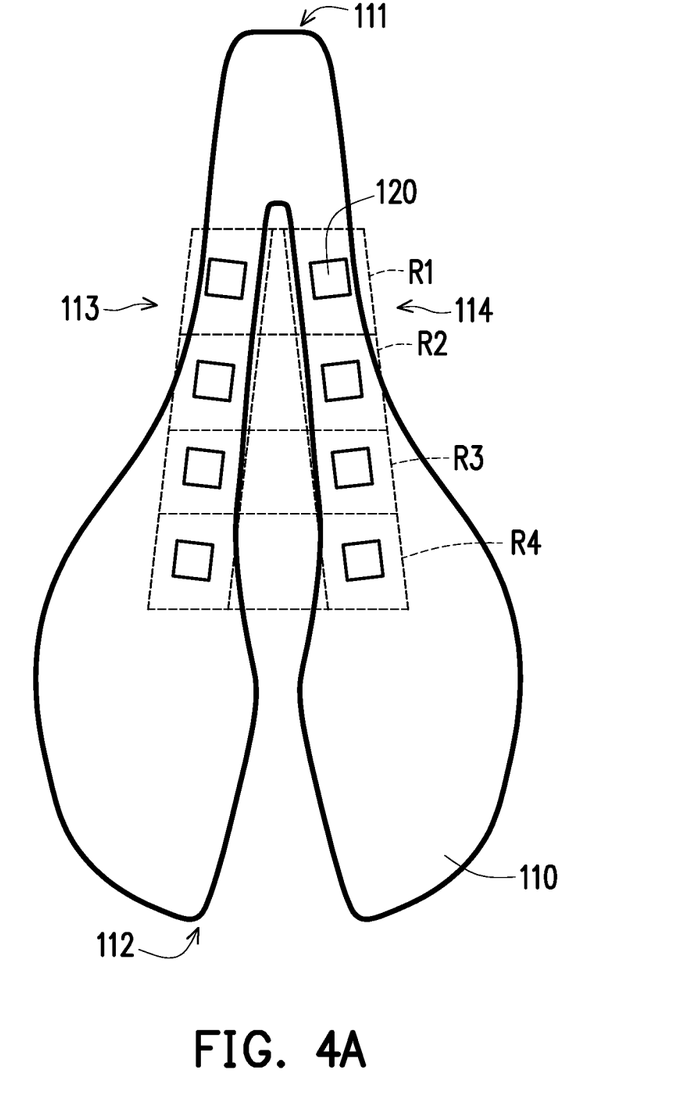
FIG. 4A is a top view of a seat according to an embodiment of the disclosure.

FIG. 1 is a schematic view of an appearance of a riding vehicle according to the disclosure. FIG. 2 is a schematic block view of a riding vehicle according to the disclosure. Please refer to FIG. 1 and FIG. 2. A riding vehicle 100 of the embodiment is used for a user (not shown) to ride and includes a seat 110, multiple pressure sensors 120, a signal conversion module 130, a power supply module 140, a transmission module 20, an identifying control module 30, at least one first sensor 150, at least one second sensor 160, an inertial measurement unit 170, and at least one driver 180. The pressure sensors 120 are disposed on the seat 110 to form multiple sensing areas (shown as R1, R2, R3, and R4 in FIG. 4). In the embodiment, the pressure sensors 120 are embedded in the seat 110, but not limited thereto. The at least one first sensor 150, the at least one second sensor 160, and the inertial measurement unit 170 may be selectively disposed according to requirements. The riding vehicle 100 is, for example, a pedal bicycle, a mountain bike, a hybrid vehicle, or an electric-assisted bicycle, but not limited thereto.

Figure 3:
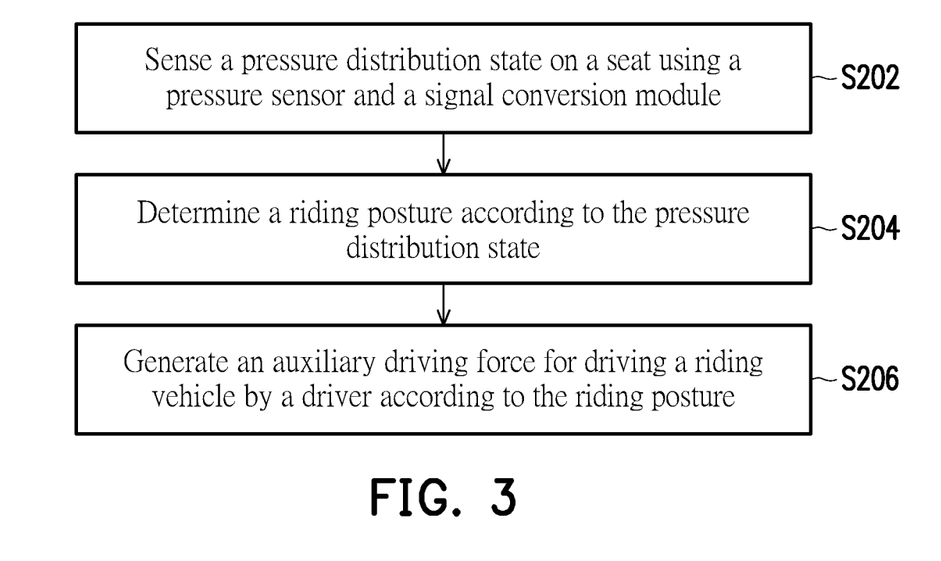
FIG. 3 is a schematic flowchart of a riding vehicle motion analysis method according to the disclosure.

FIG. 3 is a schematic flowchart of a riding vehicle motion analysis method according to the disclosure. Please refer to FIG. 2 and FIG. 3 at the same time. The method of the embodiment is applicable to the riding vehicle 100 of FIG. 2, and the detailed steps of the riding vehicle motion analysis method of the disclosure will be explained below in conjunction with action relationships between elements in the riding vehicle 100.

In Step S202, a pressure distribution state on the seat 110 may be sensed through the pressure sensors 120 and the signal conversion module 130. In an embodiment, the pressure sensors 120 perform a pressure sensing action, and the signal conversion module 130 generates multiple sensing signals corresponding to the sensing areas according to the pressure sensing action, so as to obtain the pressure distribution state, but not limited thereto.

In Step S204, a riding posture may be determined according to the pressure distribution state. In an embodiment, the signal conversion module 130, for example, digitizes signals sent by the pressure sensors 120 (convert currents into voltage values) to generate the sensing signals, thereby generating the pressure distribution state. The identifying control module 30 determines the riding posture according to the pressure distribution state and generates a control signal. Specifically, the identifying control module 30 receives the sensing signals generated by the signal conversion module 130 through a wireless communication module thereof to determine the riding posture, and generates the control signal according to the riding posture, but not limited thereto. Here, the identifying control module 30 is, for example, a tablet computer, a smart phone, a personal digital assistant (PDA), or an embedded computer disposed on a vehicle (a vehicle body), but not limited thereto.

In Step S206, the at least one driver 180 may generate an auxiliary driving force for driving the riding vehicle 100 according to the riding posture. In an embodiment, the at least one driver 180 is coupled to the identifying control module 30. The driver 180, for example, is a motor drive controller, is suitable for being disposed at a position A21, a position A22, or a position A23 shown in FIG. 1, and may be divided into front drive, rear drive, or mid-motor drive, but not limited thereto. In another embodiment, the at least one driver 180 is, for example, an electronic damping adjustment unit, but not limited thereto.

Specifically, the at least one driver 180 is used to be driven according to the control signal to adjust the auxiliary driving force of the riding vehicle 100. In an embodiment, the signal conversion module 130 is coupled to the transmission module 20. The transmission module 20 is, for example, a wireless communication module and may communicate with the identifying control module 30 through wireless transmission via the Bluetooth communication protocol, and then drive the at least one driver 180 through wireless transmission via the identifying control module 30, but not limited thereto. In other embodiments, the transmission module 20 may also be a wired communication module. In actual applications, the relevant settings of the identifying control module 30 and the signal conversion module 130 may be performed through an application (APP) or a graphical user interface (GUI), but not limited thereto.

The relevant functions of the signal conversion module 130 may be implemented by various logic blocks, modules, and circuits in one or more controllers, microcontrollers (MCUs), microprocessors, central processing units (CPUs), and/or other processing units.

Under the above configuration, partition sensing of the seat 110 is performed according to the positions of the pressure sensors 120, and obtains a weight distribution when loaded through a comparison instrument. Furthermore, after the application of the identifying control module 30 is connected to the pressure sensors 120, the values of the pressure sensors 120 may be reset to zero when entering an operation interface to eliminate any background value, and a load distribution of each area may be obtained through a given weight and measurement.

In this way, the riding vehicle 100 can intelligently detect the riding posture, and obtain the actual riding posture of the user of the riding vehicle 100 through sensing the load distribution of each area by the pressure sensors 120 during an actual riding process, so as to increase a speed of artificial intelligence (AI) electric drive, detect riding fatigue, and provide a riding fatigue warning.

Figure 4B:
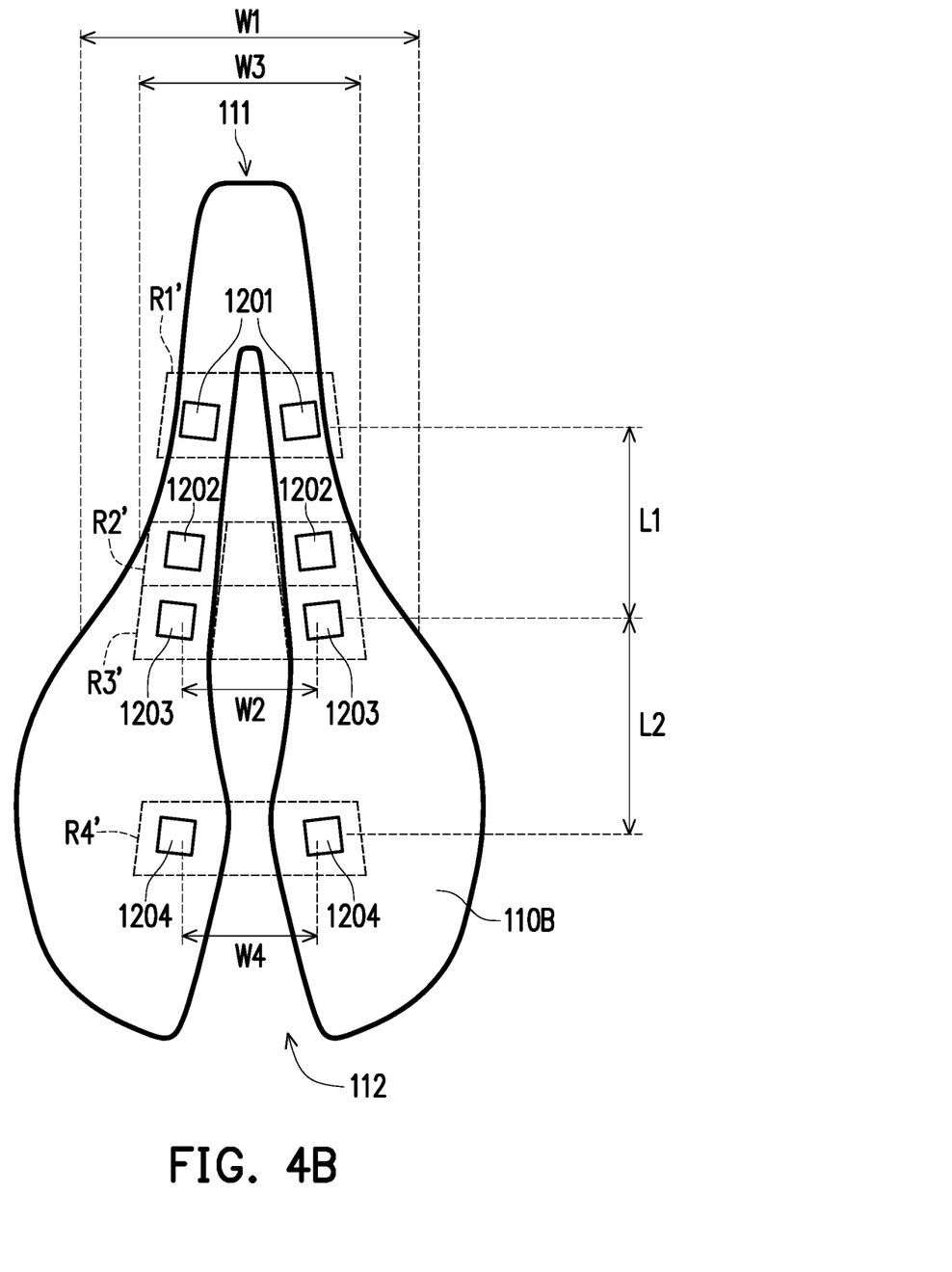
FIG. 4B is a top view of a seat according to another embodiment of the disclosure.

FIG. 4A is a top view of a seat according to an embodiment of the disclosure. FIG. 4B is a top view of a seat according to another embodiment of the disclosure. Please refer to FIG. 4A and FIG. 4B. In the embodiment, the pressure sensors 120 are arranged in a matrix. The number of the pressure sensors 120 shown is eight, but not limited thereto. The number of the pressure sensors 120 may be adjusted according to requirements. Specifically, the seat 110 includes a front end 111 and a rear end 112 opposite to each other and a first side 113 and a second side 114 opposite to each other. The sensing areas are first partitions R1 and R1', second partitions R2 and R2', third partitions R3 and R3', and fourth partitions R4 and R4' arranged from the front end 111 toward the rear end 112. The partitions may be disposed without any interval. As shown in FIG. 4A, the first partition R1, the second partition R2, the third partition R3, and the fourth partition R4 are disposed close to each other without any interval. On the other hand, the partitions may be disposed at intervals according to requirements. As shown in FIG. 4B, a distance between the first partition R1' and the second partition R2' is 20 cm, and a distance between the third partition R3' and the fourth partition R4' is 60 cm, but not limited thereto. For example, two pressure sensors 1203 of the third partition R3' are disposed at the position of a lateral width W1 of the seat 110B, and the width W1 is, for example, 180 mm plus or minus 5 mm, but not limited thereto. The two pressure sensors 1203 are spaced apart from each other by a width W2, and the width W2 is, for example, 60 mm plus or minus 10 mm, but not limited thereto. Two pressure sensors 1202 of the second partition R2' are disposed at the position of a lateral width W3 of the seat 110B, and the width W3 is, for example, 70 mm plus or minus 5 mm, but not limited thereto. The two pressure sensors 1202 are spaced apart from each other by a lateral width of about 60 mm plus or minus 10 mm, but not limited thereto. A distance L2 between two pressure sensors 1204 of the fourth partition R4' and the two pressure sensors 1203 of the third partition R3' is, for example, 60 mm plus or minus 20 mm, but not limited thereto. A width W4 of the two pressure sensors 1204 is, for example, 50 mm plus or minus 15 mm, but not limited thereto. A distance L1 between two pressure sensors 1201 of the first partition R1' and the two pressure sensors 1203 of the third partition R3' is, for example, 60 mm plus or minus 20 mm, but not limited thereto. A lateral width of the two pressure sensors 1201 is approximately 40 mm plus or minus 15 mm, but not limited thereto. Here, a direction from the front end 111 toward the rear end 112 is, for example, a straight direction, and the lateral direction is perpendicular to the straight direction.

Each partition is provided with two pressure sensors 120 respectively corresponding to the first side 113 and the second side 114. The pressure distribution state is obtained according to a magnitude relationship of pressure values corresponding to the first partition R1, the second partition R2, the third partition R3, and the fourth partition R4 to further determine the riding posture. In other embodiments, ten pressure sensors 120 may also be disposed, and sensing areas are a first partition to a fifth partition, or eight pressure sensors 120 may be disposed same as the embodiment, but sensing areas are only a first partition and a second partition, which means that each partition is provided with four pressure sensors 120, but not limited thereto.

In the embodiment, the sensing areas respectively correspond to the first side 113 and the second side 114. By comparing the pressure value of the first side 113 with the pressure value of the second side 114, whether a force exerted by the user of the riding vehicle 100 is balanced is determined, thereby providing guidance for motion coordination of lower limbs. For example, if the pressure value of the first side 113 is greater than the pressure value of the second side 114, the force exerted by the user is unbalanced is determined, and guidance that the center of gravity of the lower limbs should be toward the second side 114 is provided.

Figure 5:
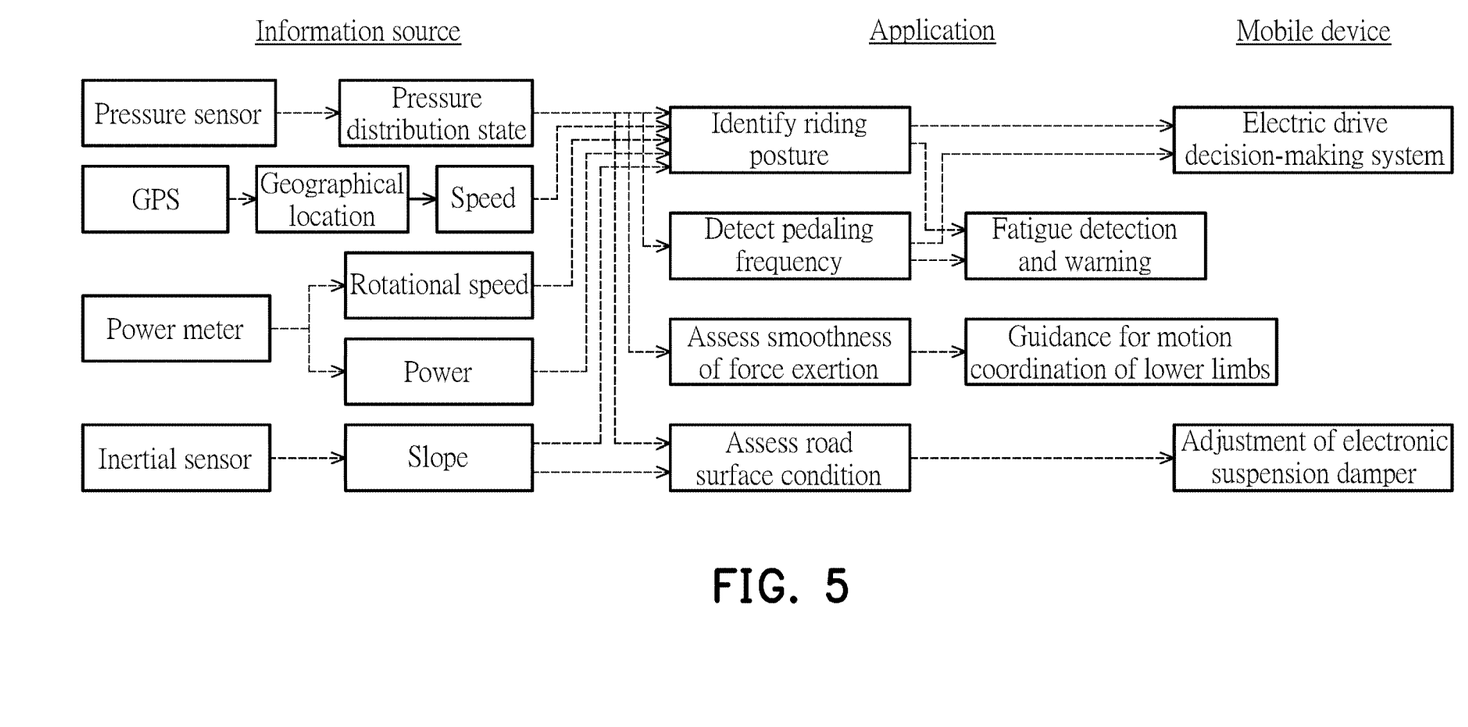
FIG. 5 is a schematic structural view of a riding vehicle according to an embodiment of the disclosure.

FIG. 5 is a schematic structural view of a riding vehicle according to an embodiment of the disclosure. The structure of the embodiment is applicable to the riding vehicle 100 of FIG. 2. The motion analysis method of the disclosure will be further explained below with reference to the action relationships between the elements in the riding vehicle 100.

Please refer to FIG. 2 and FIG. 5. In an embodiment, the at least one driver 180 is, for example, an electronic suspension damper. The inertial measurement unit 170 is used to determine whether a road surface condition is an uphill road section, a downhill road section, or a flat road section, thereby providing adjustment of the electronic suspension damper. Here, the inertial measurement unit 170 is suitable for being disposed at the position A1 shown in FIG. 1, but not limited thereto.

In an embodiment, by the inertial measurement unit 170 and the determination of the riding posture, artificial intelligence electric drive can be achieved. For example, when the pressure distribution state is leaning rearward on the uphill road section, the electronic suspension damper may be driven to stiffen the suspension damper. When the pressure distribution state is leaning forward on the downhill road section, the electronic damping adjustment unit may be driven to soften the suspension damper.

In more detail, the following various electric drive motor control decision-making situations may be roughly divided into, but not limited thereto.

For example, on a normal road surface, the pressure distribution state is bumping, and a main load partition pressure change amount of the seat 110 is higher than a first threshold and lower than a second threshold, then suspension hardness is normal.

On a smooth road surface, the pressure distribution state is relatively stable bumping, the road surface slope is less than a certain degree, and the main load partition pressure change amount of the seat 110 is lower than the first threshold, then the suspension damper is stiffened, so that the pedaling force may be directly transmitted.

On a bumpy road surface, the pressure distribution state is relatively vigorous bumping, and the main load partition pressure change amount of the seat 110 exceeds the second threshold, then the suspension damper is softened to increase riding safety.

Figure 6A:
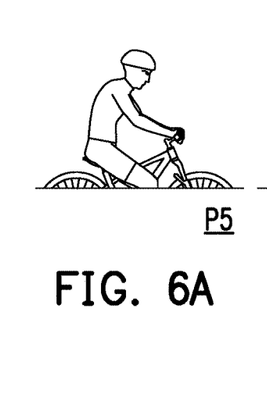
FIG. 6A to FIG. 6F are schematic views of various riding postures according to an embodiment of the disclosure.
Figure 6B:
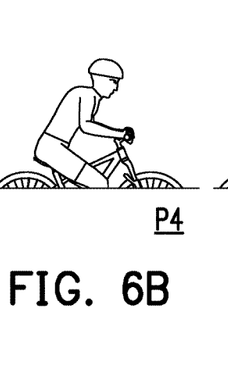
Figure 6C:
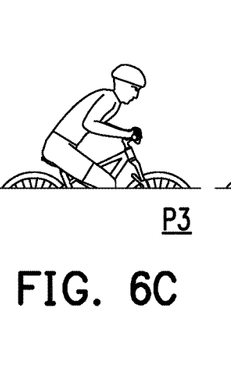
Figure 6D:
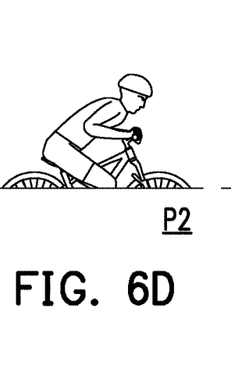
Figure 6E:
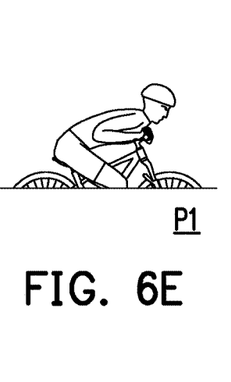
Figure 6F:
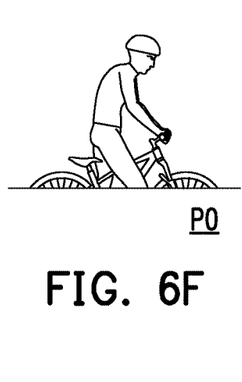

FIG. 6A to FIG. 6F are schematic views of various riding postures according to an embodiment of the disclosure. In FIG. 6A, the center of gravity of the upper body of the user is maintained directly above the ischium without leaning forward, and the ischium part evenly exerts a force on all the sensing areas on the seat 110, which is defined as a posture P5. In FIG. 6B, the center of gravity of the user is slightly leaning forward, which is defined as a posture P4. In FIG. 6C, FIG. 6D, and FIG. 6E, the user is leaning forward more and more, so that the center of gravity becomes more and more concentrated in the sensing areas of the seat 110 close to the front end 111 (FIG. 4), which are respectively defined as a posture P3, a posture P2, and a posture P1. In FIG. 6F, the user continues to step on the pedals, but the ischium moves away from the seat 110, which is a state of standing cycling and is defined as a posture P0.

Figure 7A:
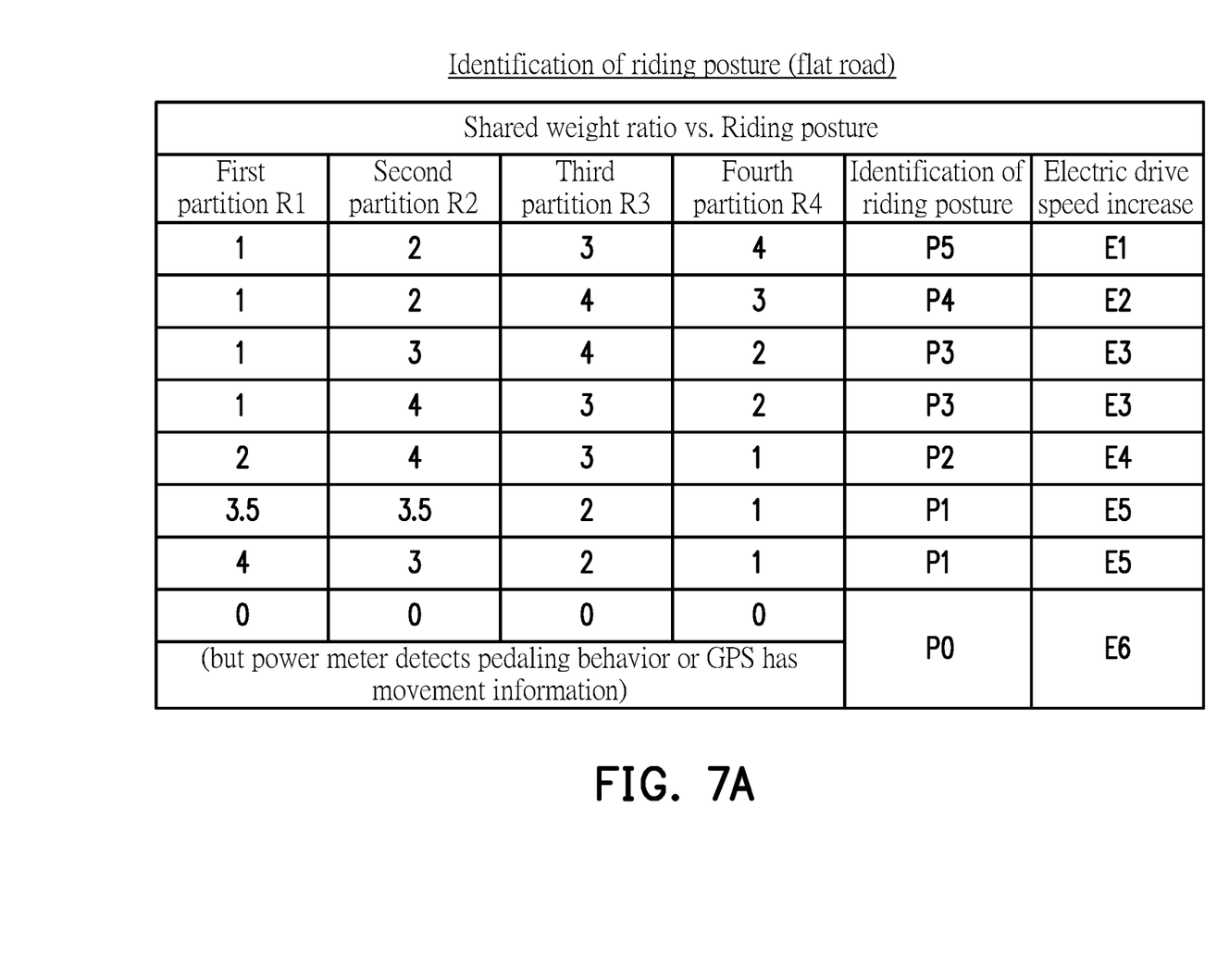
FIG. 7A to FIG. 7C are schematic views of riding posture identification corresponding to auxiliary driving force and pressure distribution state according to an embodiment of the disclosure.
Figure 7B:
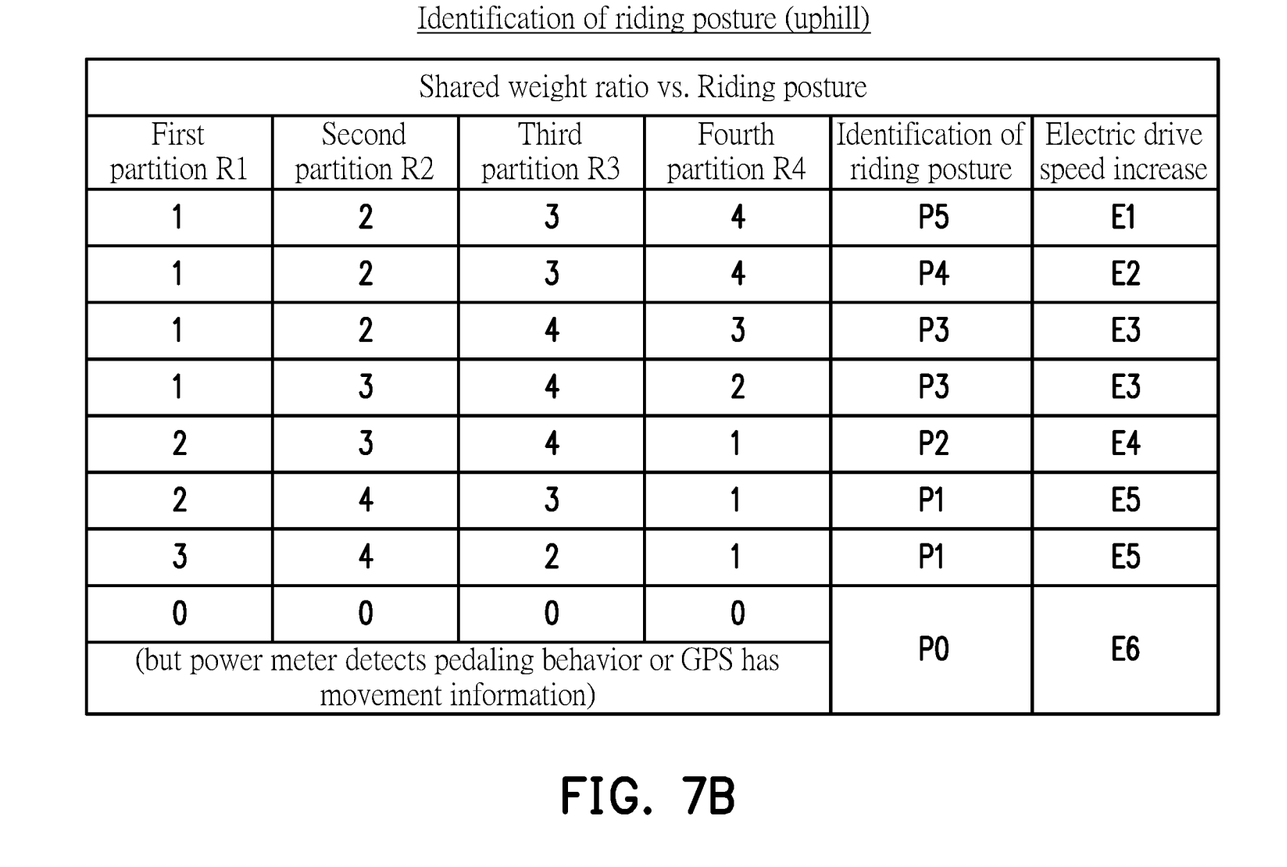
Figure 7C:
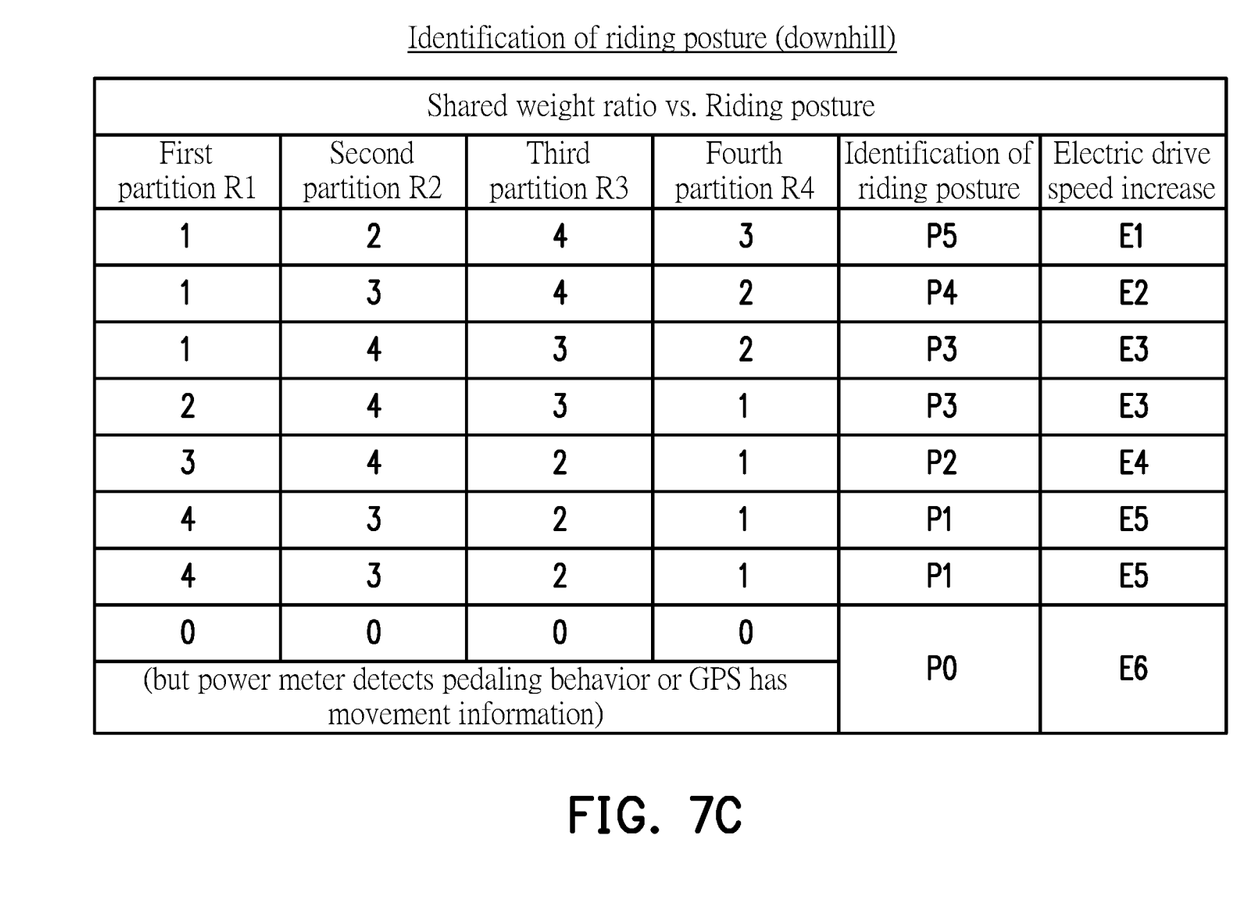

FIG. 7A to FIG. 7C are schematic views of riding posture identification corresponding to auxiliary driving force and pressure distribution state according to an embodiment of the disclosure. FIG. 7A to FIG. 7C respectively indicate a flat road section, an uphill road section, and a downhill road section. It should be noted that values 0 to 4 corresponding to the sensing areas (the first partition R1 to the fourth partition R4) in the table represent proportions of the pressure values. In other words, the value 0 represents the pressure proportion 0 and the value 4 represents the maximum pressure proportion. Auxiliary driving forces E1, E2, E3, E4, E5, and E6 increment in sequence. In other words, the auxiliary driving force E1 is the minimum force and the auxiliary driving force E5 is the maximum force.

Please refer to FIG. 7A. For example, the first partition R1 is closest to the front end 111 of the seat 110. Therefore, when the first partition R1 is the value 4 (representing the maximum pressure value), the corresponding riding posture is identified as the posture P1 leaning forward the most (FIG. 6E), and the intention of the user is to accelerate is determined. At this time, the stronger auxiliary driving force E5 is provided to increase the speed of artificial intelligence electric drive.

In another embodiment, increases or decreases in ratios of signal values of the sensing signals of different partitions in FIG. 4A or FIG. 4B and a 90-degree riding posture may be used to identify the riding posture, and key features are obtained in combination with feature analysis or artificial intelligence (AI) machine learning. Features are used to define a posture category determination formula. Specifically, sitting postures at various angles may be obtained from a calibration procedure, and the signal values of the sensing signals are set as reference base values. For example, the 90-degree riding posture is the posture P5, a 60-degree riding posture is the posture P4, and a 45-degree riding posture is the posture P3. When the AI machine learning determines the above postures, the driving forces E1, E2, and E3 increment in sequence may be correspondingly provided, but the disclosure is not limited thereto. An AI machine learning determination formula is, for example, if a sum of absolute values of values measured by sensors of the fourth partition R4 is greater than a first value (for example, 0.02), the riding posture=90 degrees, and if a relative value (compared to 90 degrees) of a value measured by one of the sensor of the third partition R3 is greater than a second value (for example, 2.6), the riding posture=45 degrees; otherwise, the riding posture=60 degrees, but the disclosure is not limited thereto. The embodiment may also be manually defined and calculated, but not limited thereto.

Please refer to FIG. 2. In the embodiment, at least one first sensor 150 is used to sense speed information of the riding vehicle 100. For example, whether the riding posture is standing cycling is determined through the identifying control module 30 according to the speed information and the sensing signals. When the speed information is not equal to 0 and the signal values of the sensing signals received by the identifying control module 30 for a continuous period of time is 0, the riding posture is determined as the posture P0 (that is, the state of standing cycling). The period of time is, for example, 2 seconds, but not limited thereto. On the other hand, please refer to FIG. 7A. When the riding posture is detected as the posture P0, it indicates that the intention of the user is to accelerate. At this time, the strongest auxiliary driving force E6 is provided to increase the speed of artificial intelligence electric drive.

In an embodiment, the at least one first sensor 150 is, for example, a power meter. The power meter may be a large disk type and is disposed at the position A3 shown in FIG. 1, but not limited thereto. In other embodiments, the power meter may also be a crank type, a pedal type, or a tire valve type, but not limited thereto. Please refer to FIG. 5. The power meter is used to provide power and rotational speed to the application of the identifying control module 30 for analysis to perform electric drive decision-making.

In an embodiment, the at least one first sensor 150 is, for example, a global positioning system (GPS) and is disposed at the position A2 shown in FIG. 1, but not limited thereto. Speed conversion through a GPS signal is used to provide geographical location and the speed information to the application of the identifying control module 30 for analysis to perform electric drive decision-making.

Figure 8:
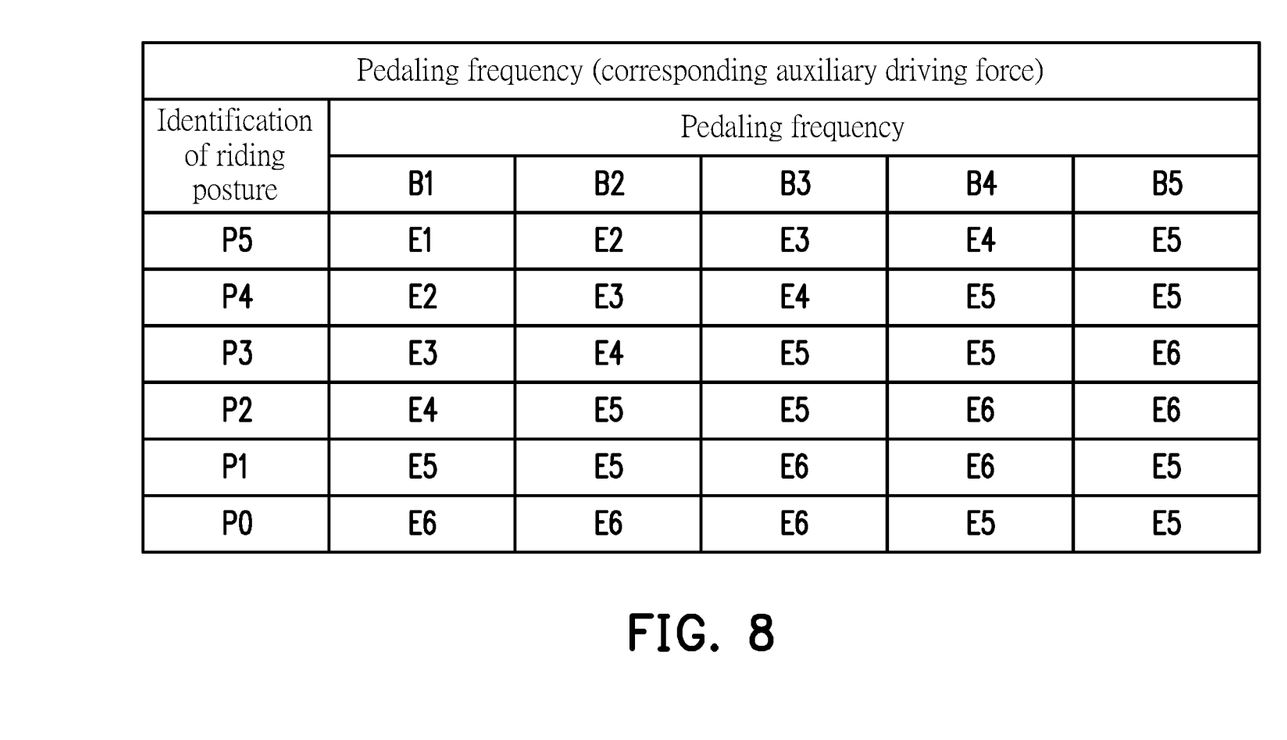
FIG. 8 is a schematic view of auxiliary driving force corresponding to riding posture and pedaling frequency according to an embodiment of the disclosure.

FIG. 8 is a schematic view of auxiliary driving force corresponding to riding posture and pedaling frequency according to an embodiment of the disclosure. It should be noted that pedaling frequencies B1, B2, B3, B4, and B5 increment in sequence. In other words, the pedaling frequency B1 is the lowest frequency and the pedaling frequency B5 is the highest frequency. The pedaling frequency B1 is, for example, below 60 rpm, the pedaling frequency B2 is, for example, 60 rpm to 80 rpm, the pedaling frequency B3 is, for example, 80 rpm to 100 rpm, the pedaling frequency B4 is, for example, 100 rpm to 120 rpm, and the pedaling frequency B5 is, for example, above 120 rpm, but not limited thereto.

Please refer to FIG. 2. In the embodiment, the riding vehicle 100 includes multiple pedals. At least one second sensor 160 is disposed on at least one of the pedals, such as at a position A4 of FIG. 1. Specifically, in the motion analysis method, a pedaling sensing action may be performed by the at least one second sensor 160 to generate pedaling frequency information. The at least one second sensor 160 is, for example, a power meter, but not limited thereto. In this way, the at least one driver 180 may be controlled through the identifying control module 30 according to the pedaling frequency information and the riding posture, so that the at least one driver 180 may adjust the auxiliary driving force.

Please refer to FIG. 8. For example, when the pedaling frequency is B5, it indicates that the user pedals quickly. At this time, the stronger auxiliary driving force E5 or auxiliary driving force E6 is provided to increase the speed of artificial intelligence electric drive. Furthermore, when the riding postures are the postures P2 and P3 shown in FIG. 6C and FIG. 6D and the pedaling frequency is B5, it indicates that the user is leaning forward and has the intention to accelerate. At this time, the strongest auxiliary driving force E6 is provided to increase the speed of artificial intelligence electric drive.

Figure 9:
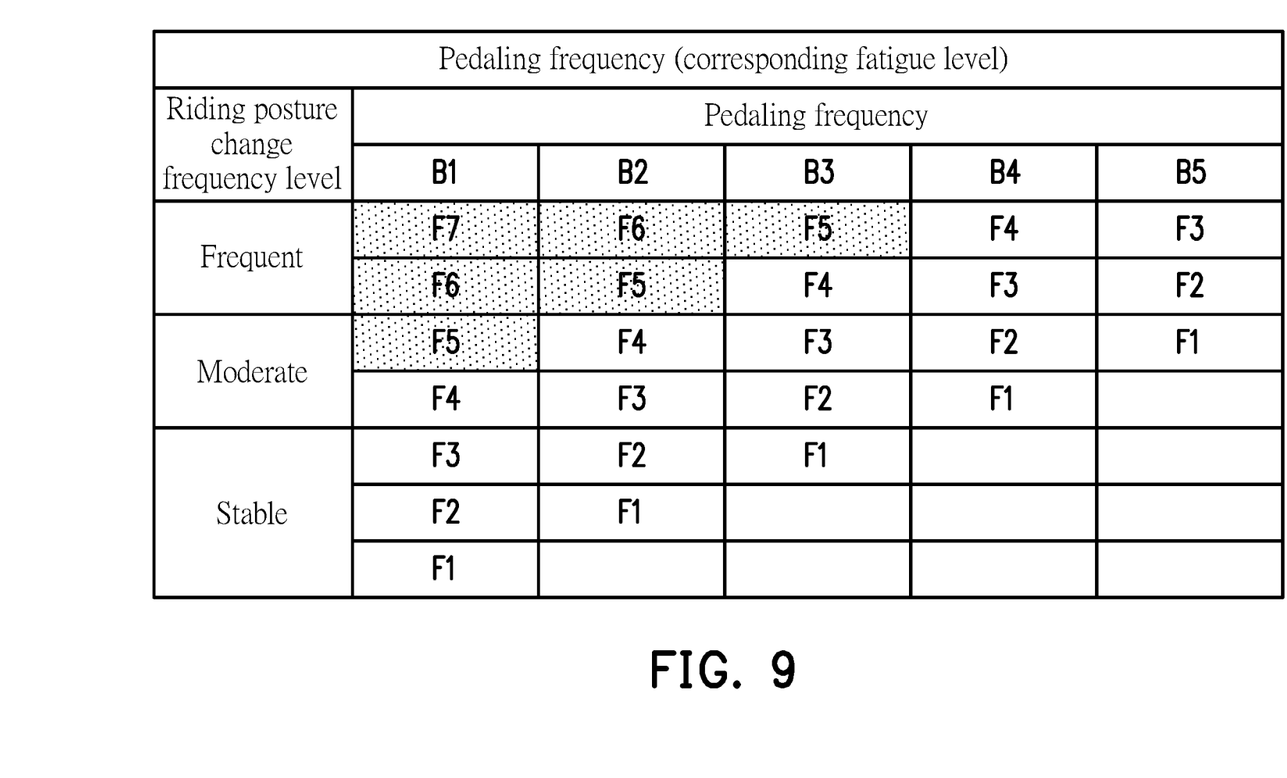
FIG. 9 is a schematic view of fatigue level corresponding to riding posture change frequency level and pedaling frequency according to an embodiment of the disclosure.

FIG. 9 is a schematic view of fatigue level corresponding to riding posture change frequency level and pedaling frequency according to an embodiment of the disclosure. That is, in the disclosure, fatigue detection and the riding fatigue warning can be provided through the riding posture change frequency level and the pedaling frequency. It should be noted that fatigue levels F1, F2, F3, F4, F5, F6, and F7 increment in sequence. In other words, the fatigue level F1 is the lowest fatigue level and the fatigue level F7 is the highest fatigue level.

Please refer to FIG. 9. For example, when the riding posture change frequency level is frequent and the pedaling frequency is B1, the fatigue level of the user is determined as F7. In FIG. 9, the fatigue levels F5, F6, and F7 indicate excessive fatigue and may be set to be within a warning range, and the riding fatigue warning is sent, but not limited thereto.

In summary, in the riding vehicle of the disclosure, the pressure signal is displayed and operated in an application interface of the identifying control module through data processing and wireless transmission unit. The partition sensing of the seat is performed according to the position of the pressure sensors, and the weight distribution when loaded is obtained through the comparison instrument. In this way, the riding posture can be intelligently detected through the riding vehicle. During the actual riding process, the actual riding posture of the user of the riding vehicle may be obtained through sensing the load distribution of each area by the pressure sensors. Also, the riding intention of the user may be analyzed, thereby providing the additional auxiliary driving force to increase the speed of artificial intelligence (AI) electric drive, detect riding fatigue, and provide the riding fatigue warning.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A riding vehicle motion analysis method, used for a user, the riding vehicle motion analysis method comprising following steps of:
    providing a riding vehicle for the user to ride, and disposing a plurality of pressure sensors on a seat to form a plurality of sensing areas;
    sensing a pressure distribution state on the seat;
    determining a riding posture of the user according to the pressure distribution state; and
    generating an auxiliary driving force by at least one driver according to the riding posture,
    wherein the seat comprises a front end and a rear end opposite to each other, the sensing areas are a first partition, a second partition, a third partition, and a fourth partition arranged from the front end toward the rear end, and the riding posture is determined according to a magnitude relationship of pressure values corresponding to the first partition, the second partition, the third partition, and the fourth partition.

2. The riding vehicle motion analysis method according to claim 1, wherein the pressure sensors are arranged in a matrix.

3. The riding vehicle motion analysis method according to claim 1, further comprising:
    performing a pressure sensing action by the pressure sensors;
    generating a plurality of sensing signals corresponding to the sensing areas by a signal conversion module according to the pressure sensing action;
    receiving the sensing signals by an identifying control module to determine the riding posture, and generating a control signal by the identifying control module according to the riding posture; and
    driving the at least one driver according to the control signal to adjust the auxiliary driving force of the riding vehicle.

4. The riding vehicle motion analysis method according to claim 3, further comprising:
    providing at least one first sensor to sense speed information of the riding vehicle; and
    determining whether the riding posture is standing cycling through the identifying control module according to the speed information and the sensing signals, wherein when the speed information is not equal to 0 and signal values of the sensing signals received by the identifying control module for a continuous period of time are 0, the riding posture is determined as standing cycling.

5. The riding vehicle motion analysis method according to claim 4, further comprising:
    providing at least one second sensor disposed on pedals of the riding vehicle; and
    performing a pedaling sensing action by the at least one second sensor to generate pedaling frequency information.

6. The riding vehicle motion analysis method according to claim 5, further comprising:
    adjusting the auxiliary driving force according to the pedaling frequency information and the riding posture.

7. The riding vehicle motion analysis method according to claim 5, further comprising:
    determining a fatigue level of the user of the riding vehicle according to the pedaling frequency information and a change frequency of the riding posture.

8. The riding vehicle motion analysis method according to claim 1, wherein the seat comprises a first side and a second side opposite to each other, the sensing areas respectively correspond to the first side and the second side, and whether a force exerted by the user of the riding vehicle is balanced is determined by comparing a pressure value of the first side with a pressure value of the second side.

9. The riding vehicle motion analysis method according to claim 1, further comprising:
    providing an inertial measurement unit to determine whether a road surface condition is an uphill road section, a downhill road section, or a flat road section; and
    controlling the at least one driver according to the road surface condition to adjust the auxiliary driving force.

10. A riding vehicle, used for a user to ride and detecting a riding posture of the user and a road surface condition, the riding vehicle comprising:
    a seat, configured for the user to ride;
    a plurality of pressure sensors, disposed on the seat to form a plurality of sensing areas;
    a signal conversion module, electrically connected to the pressure sensors and used to generate a pressure distribution state on the seat;
    an identifying control module, used to determine the riding posture according to the pressure distribution state and generate a control signal; and
    at least one driver, generating an auxiliary driving force according to the control signal,
    wherein the seat comprises a front end and a rear end opposite to each other, the sensing areas are a first partition, a second partition, a third partition, and a fourth partition arranged from the front end toward the rear end, and the identifying control module determines the riding posture according to a magnitude relationship of pressure values corresponding to the first partition, the second partition, the third partition, and the fourth partition.

11. The riding vehicle according to claim 10, wherein the pressure sensors are arranged in a matrix.

12. The riding vehicle according to claim 10, wherein the pressure sensors are used to perform a pressure sensing action, the signal conversion module generates a plurality of sensing signals corresponding to the sensing areas according to the pressure sensing action, and the identifying control module is used to receive the sensing signals to determine the riding posture and generate the control signal according to the riding posture.

13. The riding vehicle according to claim 12, further comprising:
    at least one first sensor, used to sense speed information, wherein the identifying control module is used to determine whether the riding posture is standing cycling according to the speed information and the sensing signals, wherein when the speed information is not equal to 0 and signal values of the sensing signals received by the identifying control module for a continuous period of time are 0, the riding posture is determined as standing cycling.

14. The riding vehicle according to claim 13, further comprising at least one second sensor and a plurality of pedals, wherein the at least one second sensor is disposed on at least one of the pedals and is used to perform a pedaling sensing action to generate pedaling frequency information.

15. The riding vehicle according to claim 14, wherein the identifying control module is used to control the at least one driver according to the pedaling frequency information and the riding posture, so that the at least one driver adjusts the auxiliary driving force.

16. The riding vehicle according to claim 14, wherein the identifying control module is used to determine a fatigue level of the user according to the pedaling frequency information and a change frequency of the riding posture, and provide a riding fatigue warning.

17. The riding vehicle according to claim 10, wherein the seat comprises a first side and a second side opposite to each other, the sensing areas respectively correspond to the first side and the second side, and whether a force exerted by the user is balanced is determined by comparing a pressure value of the first side with a pressure value of the second side.

18. The riding vehicle according to claim 10, further comprising an inertial measurement unit, wherein the inertial measurement unit is used to determine whether the road surface condition is an uphill road section, a downhill road section, or a flat road section, and the identifying control module controls the at least one driver according to the road surface condition to adjust the auxiliary driving force.

* * * * *